United States Patent
Hong

(10) Patent No.: US 9,353,737 B2
(45) Date of Patent: May 31, 2016

(54) RECIPROCATING MOTOR HAVING INNER AND OUTER STATORS INTEGRALLY FORMED AND RECIPROCATING COMPRESSOR HAVING A RECIPROCATING MOTOR

(75) Inventor: Eonpyo Hong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 256 days.

(21) Appl. No.: 13/602,624

(22) Filed: Sep. 4, 2012

(65) Prior Publication Data

US 2013/0058811 A1 Mar. 7, 2013

(30) Foreign Application Priority Data

Sep. 6, 2011 (KR) .................. 10-2011-0090317

(51) Int. Cl.
*F04B 35/04* (2006.01)
*H02K 33/06* (2006.01)

(52) U.S. Cl.
CPC .............. *F04B 35/045* (2013.01); *H02K 33/06* (2013.01); *F04B 2203/0403* (2013.01)

(58) Field of Classification Search
CPC ......... H02K 1/34; H02K 33/04; H02K 41/02; F04B 35/00; F04B 35/04; F04B 35/045
USPC ................ 417/416, 417; 310/12, 14, 15, 156
See application file for complete search history.

(56) References Cited

U.S. PATENT DOCUMENTS

| 5,693,991 | A | 12/1997 | Hiterer et al. | |
|---|---|---|---|---|
| 7,614,856 | B2 * | 11/2009 | Inagaki et al. | 417/417 |
| 2002/0155012 | A1 * | 10/2002 | Zabar | 417/417 |
| 2006/0091737 | A1 * | 5/2006 | Lee et al. | 310/15 |
| 2006/0192441 | A1 * | 8/2006 | Yoon et al. | 310/15 |
| 2009/0116983 | A1 * | 5/2009 | Jeong et al. | 417/416 |
| 2009/0252623 | A1 * | 10/2009 | Choi et al. | 417/416 |
| 2009/0301293 | A1 | 12/2009 | Bechtold et al. | |
| 2010/0310393 | A1 * | 12/2010 | Lee et al. | 417/417 |

FOREIGN PATENT DOCUMENTS

| CN | 1508940 A | 6/2004 |
|---|---|---|
| CN | 1579044 A | 2/2005 |

(Continued)

OTHER PUBLICATIONS

Korean Office Action dated Dec. 18, 2012.

(Continued)

*Primary Examiner* — Justin Jonaitis
*Assistant Examiner* — Stephen Mick
(74) *Attorney, Agent, or Firm* — Ked & Associates, LLP

(57) ABSTRACT

A reciprocating motor and reciprocating compressor having a reciprocating motor are provided. Making of the reciprocating motor is made easier, and therefore, manufacturing costs are reduced by configuring the stator such that an inner stator positioned inside a mover and an outer stator positioned outside of the mover are integrally formed, or by making inner and outer circumferential surfaces of the stator have a same curvature. Magnetic leakage is prevented as no gap is formed between the inner and outer stators, thereby improving performance of the reciprocating motor. The use of magnets may be reduced by omitting magnets between stator blocks, and therefore, manufacturing costs may be reduced, when compared to efficiency of the reciprocating motor.

17 Claims, 8 Drawing Sheets

(56) References Cited

FOREIGN PATENT DOCUMENTS

| | | |
|---|---|---|
| CN | 101552531 A | 10/2009 |
| JP | 2000-116100 A | 4/2000 |
| JP | 2001-352737 | 12/2001 |
| JP | 2004-140901 | 5/2004 |
| KR | 10-2002-0075071 A | 10/2002 |
| KR | 10-0438951 | 5/2003 |
| KR | 10-2010-0132277 | 12/2010 |

OTHER PUBLICATIONS

Chinese Office Action dated May 27, 2014, issued in Application No. 201210328204.9 (with English translation).
Chinese Office Action dated Dec. 22, 2014, issued in Application No. 201210328204.9 (with English translation).
European Search Report issued in Application No. 12183112.7 dated Oct. 21, 2015.

* cited by examiner

RECIPROCATING MOTOR HAVING INNER AND OUTER STATORS INTEGRALLY FORMED AND RECIPROCATING COMPRESSOR HAVING A RECIPROCATING MOTOR

CROSS-REFERENCE TO RELATED APPLICATION

The present disclosure relates to subject matter contained in priority Korean Application No. 10-2011-0090317, filed on Sep. 6, 2011, which is herein expressly incorporated by reference in its entirety.

BACKGROUND OF THE INVENTION

1. Field of the Invention

The present disclosure relates to a reciprocating motor and a reciprocating compressor having a reciprocating motor.

2. Background of the Invention

Generally, a reciprocating compressor serves to intake, compress, and discharge a refrigerant as a piston linearly reciprocates within a cylinder. The reciprocating compressor may be classified into a connection type reciprocating compressor or a vibration type reciprocating compressor according to the method employed to drive the piston.

In the connection type reciprocating compressor, the piston is connected to a rotating shaft associated with a rotation motor by a connection rod, which causes the piston to reciprocate within the cylinder, thereby compressing the refrigerant. On the other hand, in the vibration type reciprocating compressor, the piston is connected to a mover associated with a reciprocating motor, which vibrates the piston while the piston reciprocates within the cylinder, thereby compressing the refrigerant. The present invention relates to the vibration type reciprocating compressor, and the term "reciprocating compressor" will hereinafter refer to the vibration type reciprocating compressor.

A conventional reciprocating compressor comprises a reciprocating motor including an outer stator and an inner stator, and a mover reciprocating between the inner stator and the outer stator. At least one air gap is provided between the inner stator and the outer stator to cause the mover to reciprocate.

In recent years, a so-called 1-air gap type reciprocating motor (hereinafter, referred to as "reciprocating motor") having an air gap between the inner stator and the outer stator is known. FIGS. 1 to 4 are views showing a conventional 1-air gap type reciprocating motor.

As shown therein, the conventional reciprocating motor includes a stator 1 and a mover 5 reciprocally inserted into the stator 1.

The stator 1 includes an inner stator 2 and an outer stator 3 coupled to an outer circumferential surface of the inner stator 2.

The inner stator 2 is formed as a cylindrical shape by laminating a plurality of rectangular stator core sheets in a radial direction.

The outer stator 3 includes a plurality of stator blocks 3a formed by laminating a plurality of stator cores in a circular arc shape, the stator cores taking a cap-like shape to insert coils therein, and the plurality of stator blocks 3a being radially arranged in a circumferential direction on the outer circumferential surface of the inner stator 2.

A magnetic path connecting portion 1a is formed at a side of the stator 1 in a reciprocating direction to interconnect the outer circumferential surface of the inner stator 2 and an inner circumferential surface of the outer stator 3. An air gap portion 1b is formed on the opposite side of the magnetic path connecting portion 1a to insert the mover 5 therein.

The mover 5 includes a magnet holder 6 having a cylindrical shape and provided reciprocally with respect to the air gap portion 1b of the stator 1 and a plurality of magnets 7 coupled to an outer circumferential surface of the magnet holder 6 and forming induced magnetism with a coil 4. In the drawings, unexplained reference numeral 3b denotes a coil receiving slot.

However, the above-mentioned conventional reciprocating motor has the problem that it is difficult to manufacture the inner stator 2 and excessive expenses are required because the stator cores of the inner stator 2 have to be radially laminated.

Moreover, while the inner stator 2 is formed by radially laminating the stator cores sheet by sheet, the stator blocks 3a of the outer stator 3 have an arc shape whose inner and outer circumferential surfaces have the same length by laminating the stator cores sheet by sheet. Therefore, as shown in FIG. 4, the outer diameter curvature of the inner stator 2 and the inner diameter curvature of the outer stator 3 are different from each other, and this generates a gap (t) in the magnetic path connecting portion 1a between the outer circumferential surface of the inner stator 2 and the inner circumferential surface of the outer stator 3, thereby bringing about a degradation in motor performance caused by magnetic leakage.

In addition, the circumferential length of the stator blocks 3a is extended as both ends of the inner circumferential surface of the stator blocks 3a constituting the outer stator 3 are radially arranged so as to be in contact with each other. This may increase the use of the magnet 7, and therefore lead to an increase in manufacturing costs, when compared to the efficiency of the motor.

SUMMARY OF THE INVENTION

Therefore, an object of the present invention is to provide a reciprocating motor and a reciprocating compressor having a reciprocating motor which make the manufacture of a stator easier and therefore reduce manufacturing costs.

Another object of the present invention is to provide a reciprocating motor and a reciprocating compressor which improve motor performance by preventing magnetic leakage of a stator.

Yet another object of the present invention is to provide a reciprocating motor and a reciprocating compressor which can reduce manufacturing costs, when compared to the efficiency of the motor, by reducing the use of magnets.

To achieve these and other advantages and in accordance with the purpose of this specification, as embodied and broadly described herein, there is provided a reciprocating motor comprising: a stator; and a mover reciprocating relative to the stator, wherein the stator comprises an inner stator positioned inside the mover and an outer stator positioned outside the mover, both being integrally formed.

Furthermore, there is provided a reciprocating motor comprising: a stator; and a mover reciprocating relative to the stator, wherein the stator is formed such that the inner and outer circumferential surfaces have the same curvature.

Furthermore, there is provided a reciprocating compressor comprising: a cylinder having a compression space; a piston inserted into the compression space of the cylinder and reciprocating relative to the cylinder; a reciprocating motor having a mover coupled to the cylinder or piston to reciprocate with the cylinder or piston; and resonant springs elastically supporting the mover of the reciprocating motor, the reciprocating motor comprising the above-described components.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings.

DETAILED DESCRIPTION OF THE INVENTION

Hereinafter, a reciprocating motor and a reciprocating compressor according to the present invention will be described in detail with reference to an embodiment illustrated in the accompanying drawings.

Figure 1:
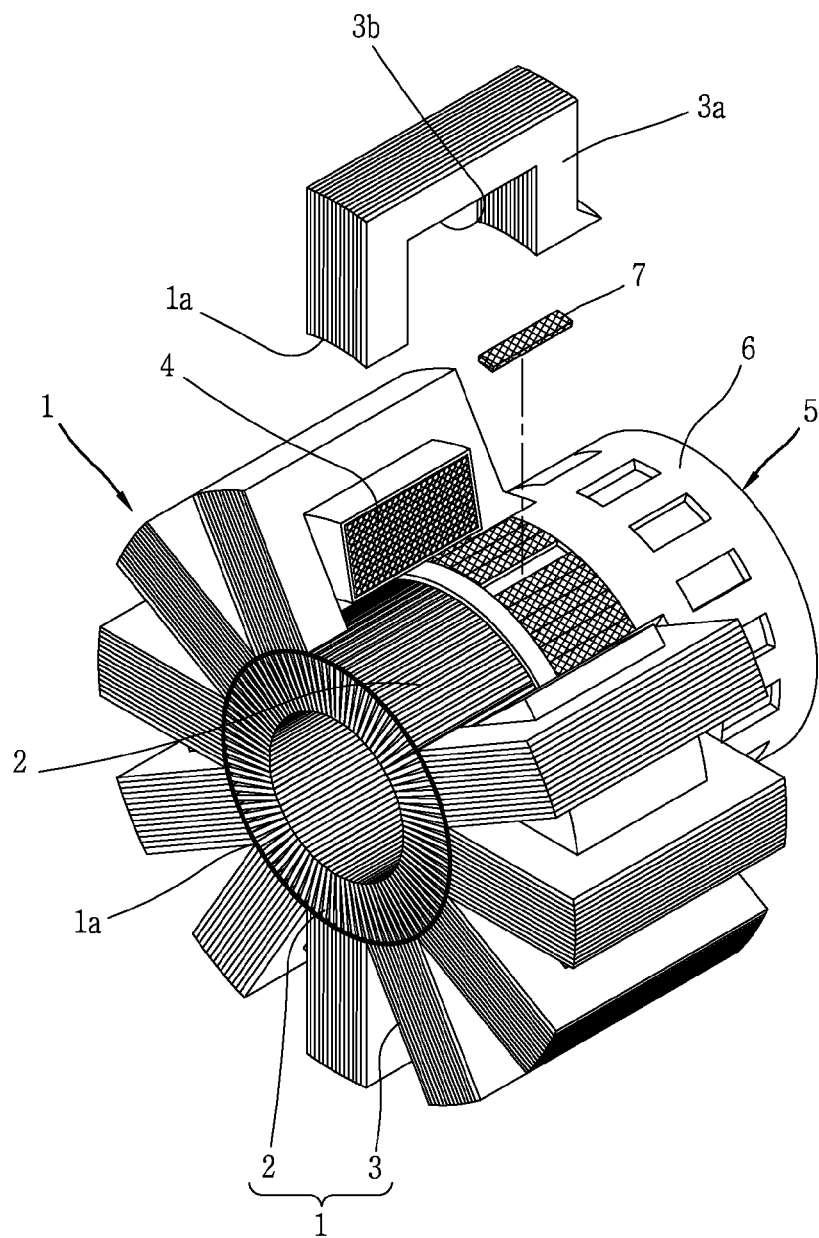
FIG. 1 is an exploded perspective view showing a conventional reciprocating motor.
Figure 2:
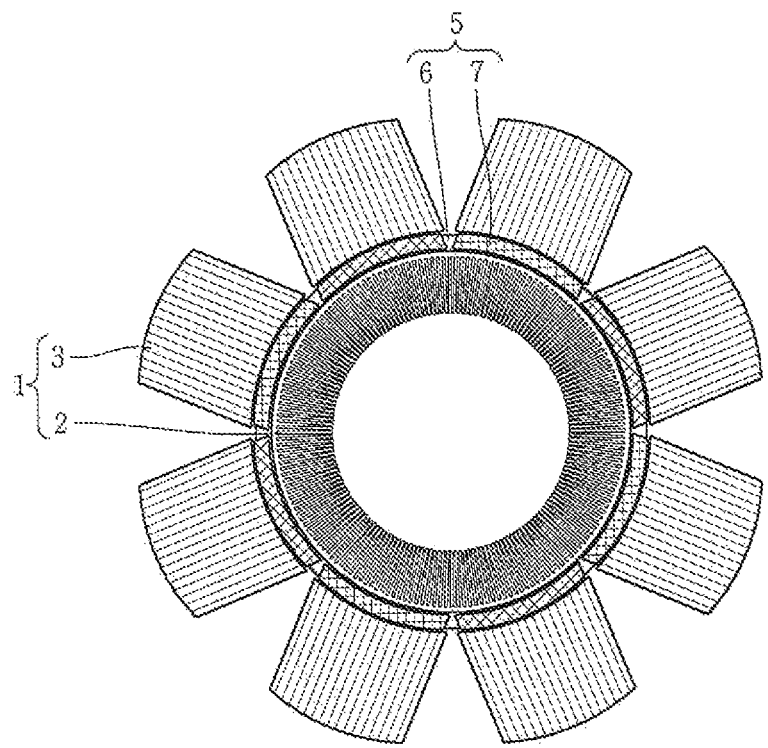
FIG. 2 is a top plan view showing the assembled state of the reciprocating motor of FIG. 1.
Figure 3:
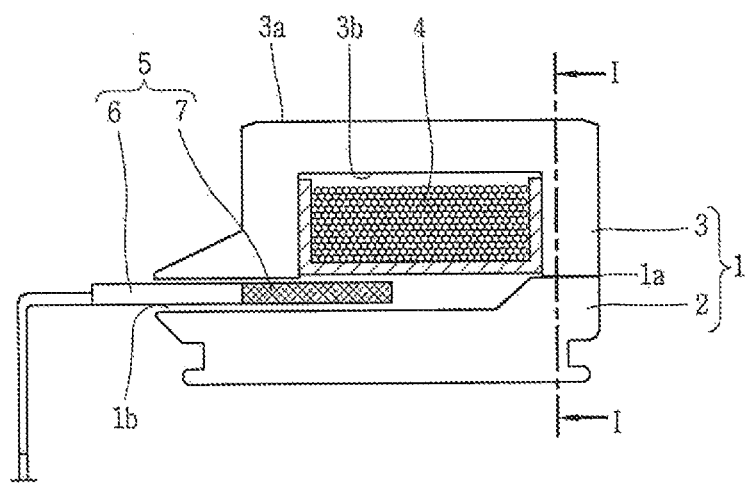
FIG. 3 is a cross-sectional view, viewed from a side, showing a part of the reciprocating motor of FIG. 2.
Figure 4:
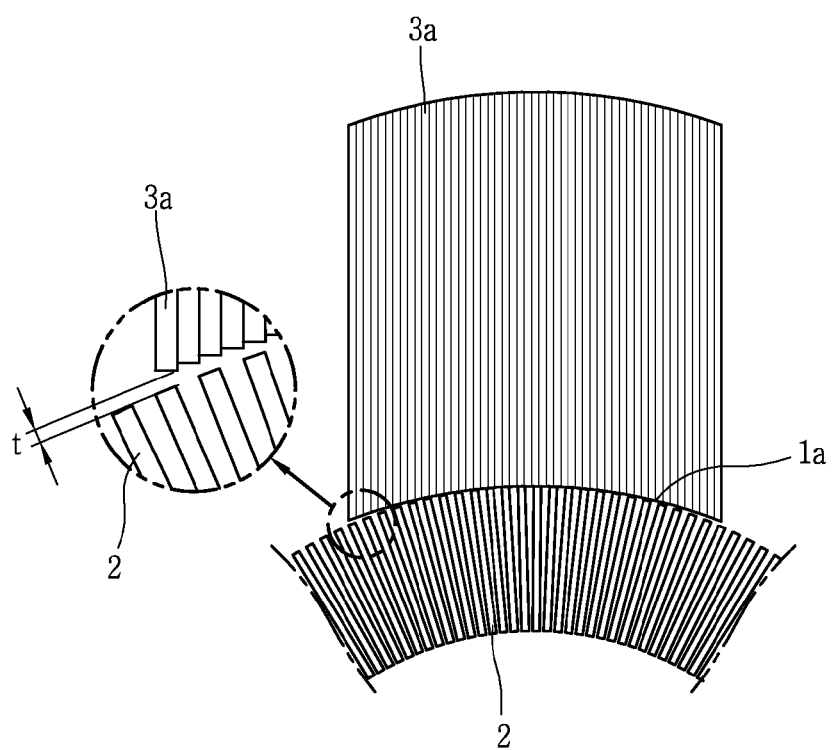
FIG. 4 is a cross-sectional view taken along line "I-I" of FIG. 3.
Figure 5:
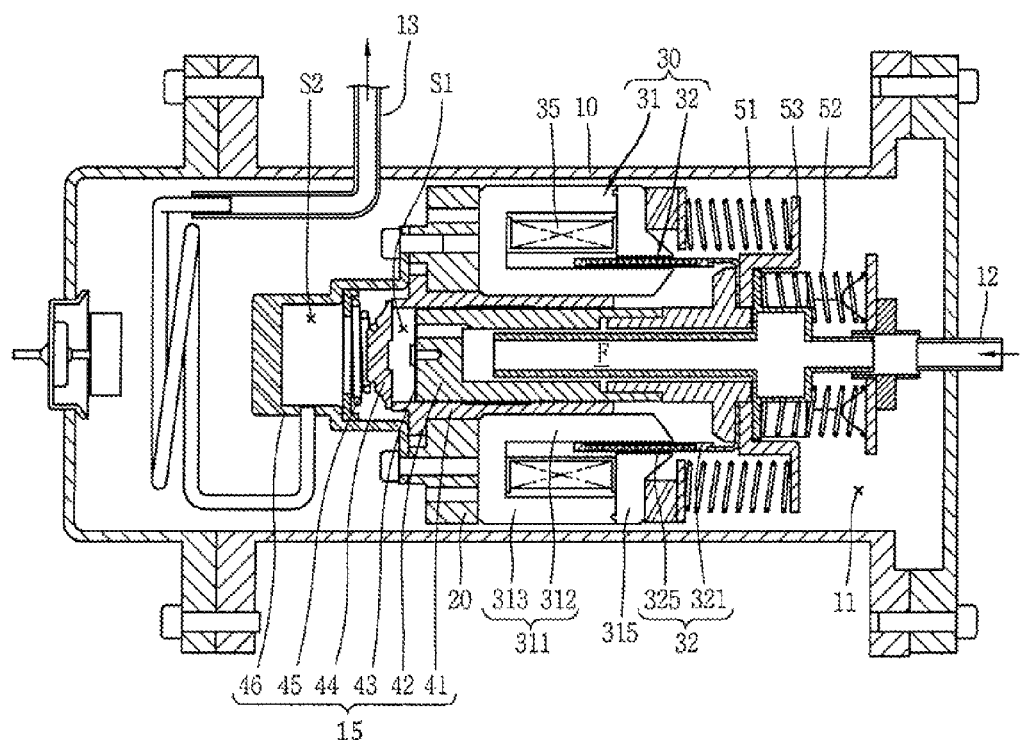
FIG. 5 is a cross-sectional view showing a reciprocating compressor according to the present invention.

As shown in FIG. 5, in the reciprocating compressor 15 according to this embodiment, a frame 20 is installed within a sealed casing 10, a reciprocating motor 30 and a cylinder 41 are fixed to the frame 20, and a piston 42 coupled to a mover 32 of the reciprocating motor 30 is inserted into the cylinder 41 to reciprocate.

A compression space S1 is formed in the cylinder 41, a suction path F is formed in the piston 42, a suction valve 43 for opening and closing the suction path F is installed at a distal end of the suction path F, and a discharge valve 44 for opening and closing the compression space S1 of the cylinder 41 is installed at a front end surface of the cylinder 41.

In the drawings, unexplained reference numeral 11 denotes an inner space of the casing, 12 denotes a suction pipe, and 13 denotes a discharge pipe.

In the aforementioned reciprocating compressor according this embodiment, when power is applied to a coil 35 of the reciprocating motor 30, the mover 32 of the reciprocating motor 30 reciprocates. Then, the piston 42 coupled to the mover 32 sucks and compresses a refrigerant gas while linearly reciprocating within the cylinder 41, and discharges it.

More specifically, when the piston 42 moves backwards, the refrigerant gas in the sealed casing 10 is sucked into the compression space S1 through the suction path F of the piston 42, and when the piston 42 moves forwards, the suction path F is closed and the refrigerant gas in the compression space S1 is compressed. Also, when the piston 42 further moves forwards, the discharge valve 44 is opened to discharge the refrigerant gas compressed in the compression space S1 and move it to the outside refrigeration cycle.

Figure 6:
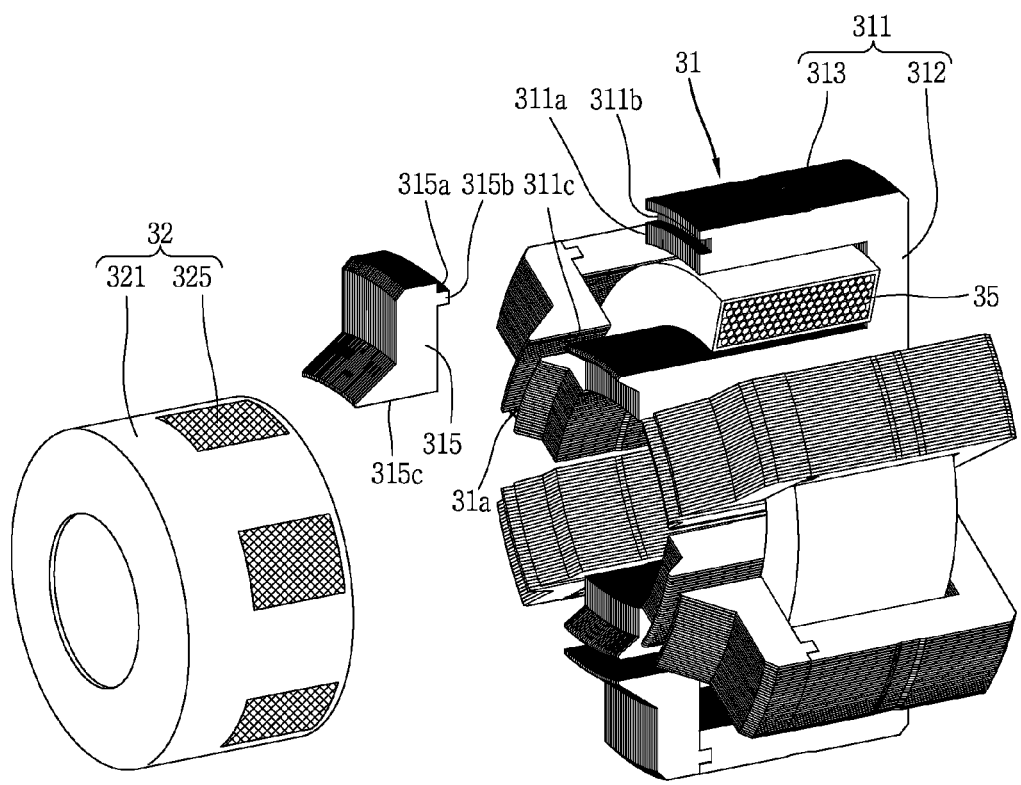
FIG. 6 is an exploded perspective view showing a reciprocating motor in the reciprocating compressor of FIG. 5.
Figure 7:
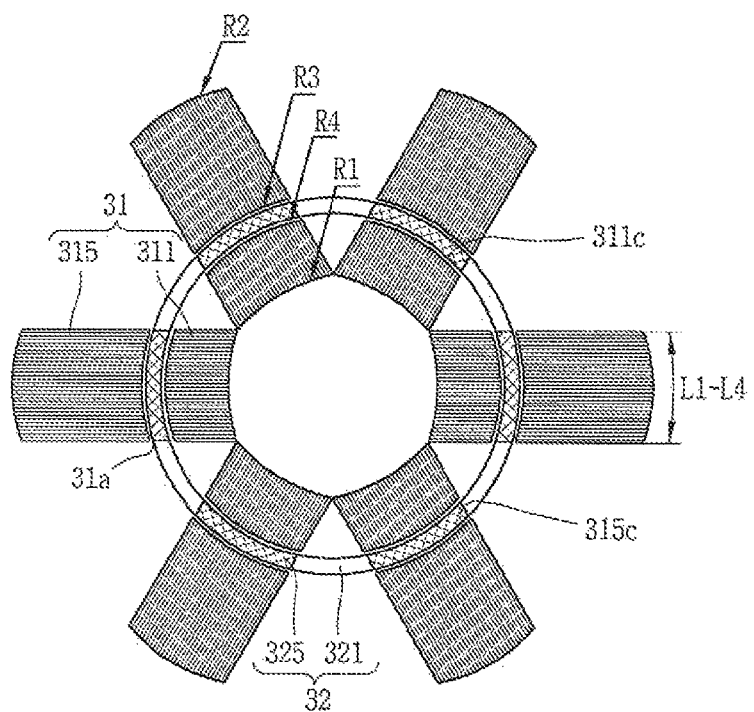
FIG. 7 is a top plan view showing the assembled state of the reciprocating motor of FIG. 1.
Figure 8:
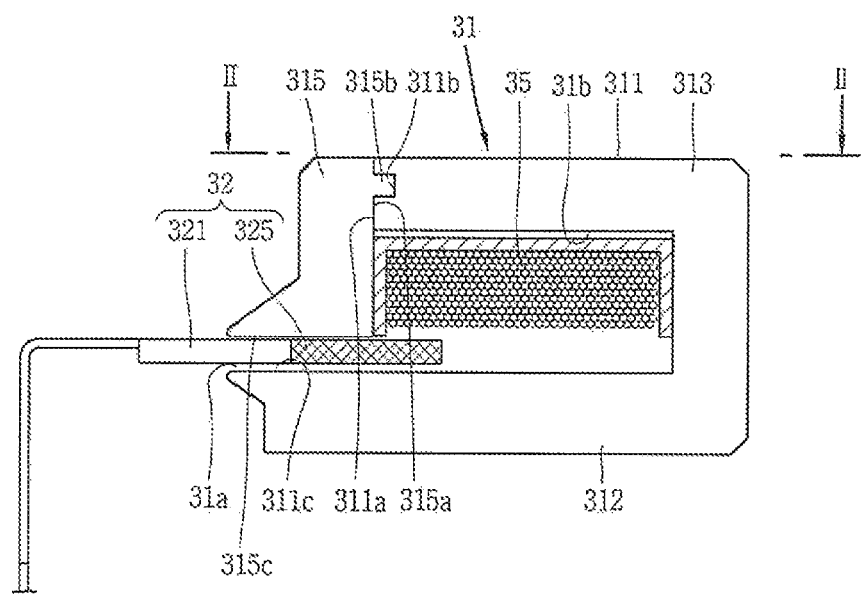
FIG. 8 is a cross-sectional view, viewed from a side, a part of the reciprocating motor of FIG. 7.
Figure 9:
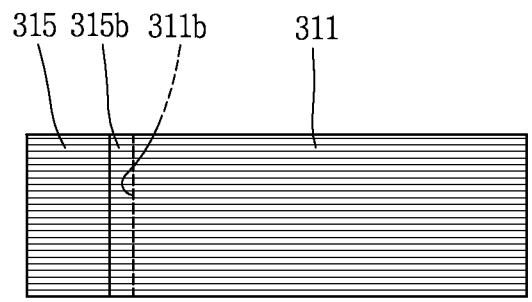
FIG. 9 is a cross-sectional view taken along line "II-II" of FIG. 8.

As shown in FIGS. 6 to 8, the reciprocating motor 30 comprises a stator 31 having a coil 35 and an air gap formed at only one side of the coil 35 and a mover 32 inserted into the air gap of the stator 31 and having a magnet 32S that linearly moves in the motion direction.

The stator 31 includes a plurality of stator blocks 311 and a plurality of pole blocks 315 respectively coupled to sides of the stator blocks 311 and forming an air gap portion 31a along with the stator blocks 311.

The stator blocks 311 and the pole blocks 315 include a plurality of thin stator cores laminated sheet by sheet in a circular arc shape when axially projected.

The stator blocks 311 are formed in the shape of recesses when axially projected, and the pole blocks 315 are formed in a rectangular shape when axially projected.

The stator block (or each of the stator core sheets constituting the stator blocks) 311 may include a first magnetic path 312 positioned inside the mover 32 to form the inner stator and a second magnetic path 313 extending integrally from an axial side of the first magnetic path 312, i.e., the opposite end of the air portion 31a, and positioned outside the mover 32 to form the outer stator.

While the first magnetic path 312 is formed in a rectangular shape, the second magnetic path 313 is formed in a stepwise manner and extends from the first magnetic path 312.

A coil receiving slot 31b opened in an axial direction, i.e., the direction of the air gap portion, is formed on inner wall surfaces of the first and second magnetic paths 312 and 313, and the pole block 315 is coupled to an axial cross-section of the second magnetic path 313 which constitutes the coil receiving slot 31b so as to open an axial open surface of the coil receiving slot 31b.

Also, a coupling groove 311b and a coupling protrusion 315b may be formed on a coupling surface of the stator block 311 and a coupling surface of the pole block 315, which connect the stator block 311 and the pole block 315 to form a magnetic path connecting portion (not shown), to firmly couple the stator block 311 and the pole block 315 and maintain a given curvature. Although not shown, the stator block 311 and the pole block 315 may be coupled in a stepwise manner.

The coupling surface 311a of the stator block 311 and the coupling surface 315a of the pole block 315, except the coupling groove 311b and the coupling protrusion 315b, are formed to be flat, thereby preventing an air gap between the stator block 311 and the pole block 315. This prevents magnetic leakage between the stator block 311 and the pole block 315, thereby leading to an increase in motor performance.

A first pole portion 311c having an increasing cross-sectional area is formed at a distal end of the second magnetic path 313 of the stator block 311, i.e., a distal end of the air gap portion 31a, and a second pole portion 315c having an increasing cross-sectional area is formed at a distal end of the pole block 315, corresponding to the first pole portion 311c of the stator block 311.

As shown in FIG. 7, when the stator block 311 is axially projected, the curvatures R1 and R2 of the inner and outer circumferential surfaces thereof, the curvature R3 of the first pole portion 311c of the air gap portion 31a, and the curvature R4 of the second pole portion 315c may be equal. Also, the circular arc length L1 of the inner circumferential surface of the stator block 311, the circular arc length L2 of the outer circumferential surface thereof, the circular arc length L3 of the first pole portion 311c, and the circular arc length L4 of the second pole portion 315c may be equal.

The mover 32 may include a magnet holder 321 having a cylindrical shape and a plurality of magnets 325 attached onto an outer circumferential surface of the magnet holder 321 in a circumferential direction to form a magnetic flux together with the coil 35.

The magnetic holder 321 may be formed of a non-magnetic substance in order to prevent flux leakage; however, it is not limited thereto. The outer circumferential surface of the magnetic holder 321 may be formed in a circular shape so that the magnets 325 are in line contact therewith and adhered thereto. Also, a magnet mounting groove (not shown) may be formed in a strip shape on the outer circumferential surface of the magnet holder 321 so as to insert the magnets 325 therein and support them in the motion direction.

The magnets 325 may be formed in a hexahedral shape and adhered one by one to the outer circumferential surface of the magnet holder 321. In the case of attaching the magnets 325 one by one, supporting members (not shown), such as fixing rings or a tape made up of a composite material, may be surrounded and fixed around outer circumferential surfaces of the magnets 325.

Although the magnets 325 may be serially adhered in a circumferential direction to the outer circumferential surface of the magnet holder 321, it is preferable that the magnets 325 are adhered at predetermined intervals, i.e., between the stator blocks in a circumferential direction to the outer circumferential surface of the magnet holder 321 to minimize the use of the magnets, because the stator 31 comprises a plurality of stator blocks 311 and the plurality of stator blocks 311 are arranged at predetermined intervals in the circumferential direction. In this case, the magnets 325 are preferably formed to have a length corresponding to the air gap length of the magnetic holder 321, i.e., the circumferential length of the air gap.

Preferably, the magnet 325 may be configured such that its length in a motion direction is not shorter than a length of the air gap portion 31a in the motion direction, more particularly, longer than the length of the air gap portion 31a in the motion direction. At its initial position or during its operation, the magnet 325 may be disposed such that at least one end thereof is located inside the air gap portion 31a, in order to ensure a stable reciprocating motion.

Moreover, though only one magnet 325 may be disposed in the motion direction, a plurality of magnets 325 may be disposed in a motion direction in some cases. In addition, the magnets may be disposed in a motion direction so that an N pole and an S pole correspond to each other.

Another example of the stator in the reciprocating motor according to this embodiment will be described below.

Figure 10:
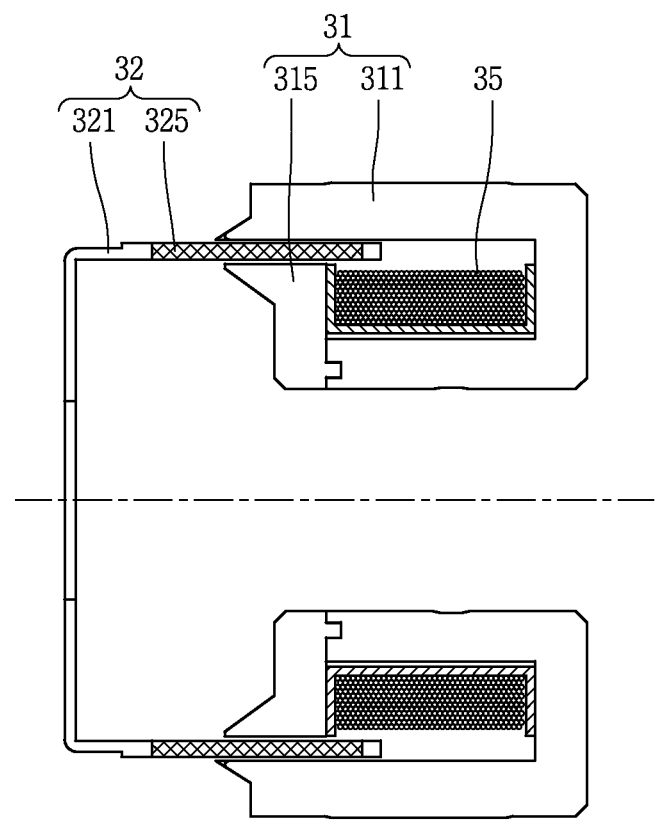
FIG. 10 is a cross-sectional view showing another embodiment of a stator in the reciprocating motor of FIG. 8.

That is, the coil receiving slot is formed such that the coil of the stator is placed outside the mover in the foregoing embodiment, whereas the coil receiving slot 31b is formed such that the coil 35 is placed inside the mover 32 as shown in FIG. 10 in this embodiment. In this case, too, the basic configuration of the stator and the operational effects thereof are similar to those of the foregoing embodiment, except that the stator 31 of this embodiment allows reduced use of coils because the coil receiving slot 31b is disposed inside the mover 32 and therefore the diameter of the coil is reduced as much.

In the reciprocating compressor according to this embodiment, resonant springs 51 and 52 may be installed at both sides of the piston 42 in the motion direction of the piston 42 in order to induce a resonant movement of the piston 42, as shown in FIG. 5.

Although the resonant springs 51 and 52 may be formed as plate springs, the plate springs have a small lateral displacement but a large longitudinal displacement. Therefore, if the compressor is installed stood in a motion direction of the piston, a stroke of the piston may not be properly performed because the piston has to reciprocate in an up-and-down direction when the piston hangs vertically downward. Moreover, when the plate springs are used, the plate springs and the piston have to be connected by a connecting bar made of soft material or by at least one link (preferably two links) on the midway of the connecting bar, in order to maintain the forward movement of the piston, which may increase material costs and the number of assembly processes.

Taking this into consideration, this embodiment is devised to reduce material costs and the number of assembly processes by varying the configuration of the compressor by using coil springs as the resonant springs, and avoiding the use of a connecting bar or link.

If the first resonant spring 51 and the second resonant spring 52 are compressed coil springs, it is preferable that the resonant springs are arranged to engage each other so as to offset a side force or torsion moment generated when the resonant springs 51 and 52 are expanded. In the drawings, unexplained reference numeral 53 denotes a spring stopper.

In the above-stated reciprocating compressor, it is required to reduce a frictional loss between the cylinder and the piston to improve the performance of the compressor.

To this end, an oil-lubricated type reciprocating compressor for supplying oil contained within the casing 10 between the cylinder 41 and the piston 42, or a gas-lubricated type reciprocating compressor for supplying a part of compressed gas discharged from the cylinder 41 between the inner circumferential surface of the cylinder 41 and the outer circumferential surface of the piston 42 to lubricate between the cylinder and the piston 42 by a gas force may be applied. In this embodiment, the gas-lubricated type reciprocating compressor will be discussed.

The gas-lubricated type (hereinafter, gas bearing) compressor according to these embodiments may have a plurality of fine through holes, and have an oxide film layer which is formed on the inner circumferential surface of the cylinder or on the outer circumferential surface of the piston and makes it easier to regulate the distribution of the fine through holes.

Figure 11:
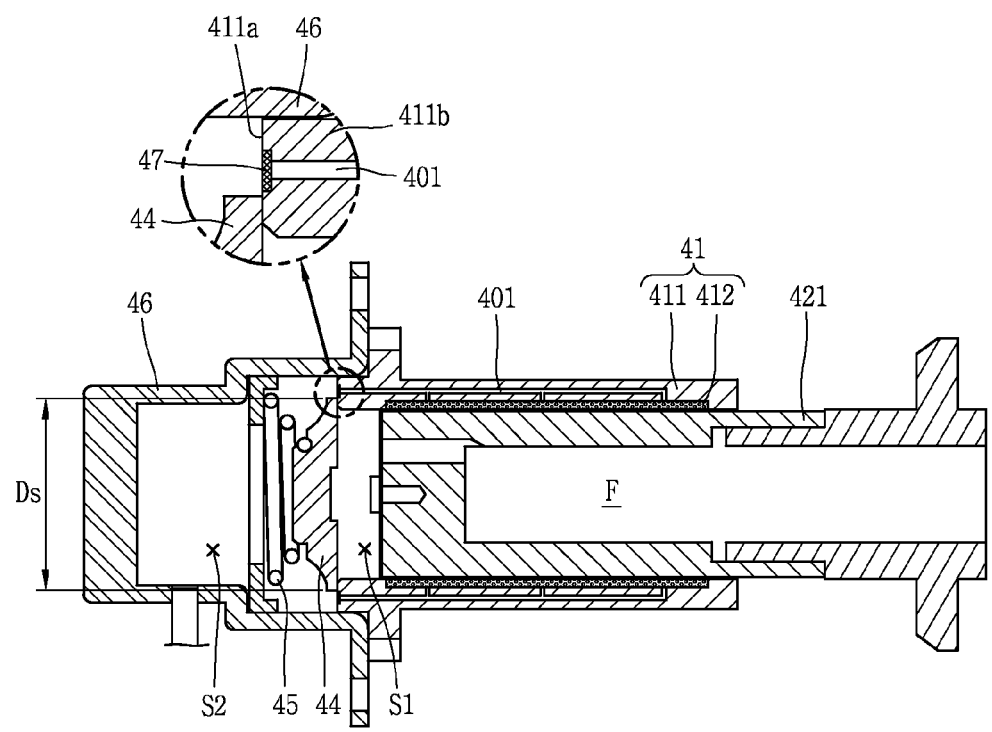
FIG. 11 is a cross-sectional view showing an embodiment of a gas bearing in the reciprocating compressor of FIG. 5.

For example as shown in FIG. 11, the oxide film layer 412 may be formed on an inner circumferential surface of a cylinder body 411 (or on an outer circumferential surface of a piston body 421) to have a plurality of fine through holes. In this case, compressed gas guided to the fine through holes through gas flow paths 401 is uniformly supplied between the cylinder 41 and the piston 42 through the fine through holes to form a gas bearing.

The oxide film layer 412 may be formed by anodizing or micro arc oxidation (MAO).

A front end surface 411a of the cylinder body 411 protrudes to a predetermined height to form a protruding portion 411b, and a discharge cover 46 is inserted and coupled to an outer circumferential surface of the protrusion 411b.

A starting end of the gas flow path 401 is preferably formed at a greater distance than the radius Ds of the discharge valve 45 relative to the center of the discharge valve 45 so that it is positioned out of the attachment/detachment range of the discharge valve 45 which is selectively attached to and detached from the front end surface 411a of the cylinder body 411.

An annular filter 47 may be installed on the front end of the gas flow path 401, i.e., the front end surface 411a of the cylinder body 411 so as to prevent impurities from entering the gas flow path 401.

Although at least one gas diffusion groove (not shown) may be further formed on the outer circumferential surface of the piston 42, a high-pressure compressed gas may be uniformly distributed over the bearing area between the cylinder 41 and the piston 42, without forming a gas diffusion groove on the outer circumferential surface of the piston 42, because the oxide film layer 412 has a porous structure.

In the case that the a porous layer is formed of the oxide film layer, the porous layer is easily formed on the inner circumferential surface of the cylinder body, and the reliability of the compressor is improved because of high abrasion resistance and high rub resistance resulting from an increase in the strength of a bearing surface formed of an oxide film layer.

Although not shown, a porous material member may be coupled to the outer circumferential surface of the piston to form gas flow paths in the cylinder and uniformly distributing and supplying a high-pressure compressed gas guided through the gas flow paths between the cylinder and the piston, or a gas guide member with gas through holes may be coupled to the outer circumferential surface of the piston to form gas flow paths in the cylinder and uniformly distributing and supplying a high-pressure compressed gas guided through the gas flow paths between the cylinder and the piston, thereby uniformly distributing the high-pressure compressed gas between the cylinder and the piston.

What is claimed is:

1. A reciprocating motor, comprising:
a stator having an annular shape; and
a mover that reciprocates relative to the stator, wherein the stator comprises an inner stator positioned inside the mover and an outer stator positioned outside the mover, wherein the inner stator and the outer stator are integrally formed as a single body, wherein the stator is formed by radially laminating a plurality of blocks, each of the plurality of blocks being formed by laminating a plurality of stator cores, wherein each of the plurality of blocks includes a stator block having a coil receiving slot to receive a coil therein, the stator block having an open wall surface corresponding to one axial side of the coil and a pole block that forms a wall surface of the coil receiving slot and is coupled to the stator block to form an air gap along with the stator block, the pole block being coupled to the open wall surface of the stator block to form the air gap, wherein a plurality of air gaps is formed at one axial side of the stator, in which the mover is inserted to reciprocate, and wherein a plurality of magnets that forms the mover is disposed between an outer circumferential surface of each of the plurality of the air gaps and an inner circumferential surface of each of the plurality of the air gaps.

2. The reciprocating motor of claim 1, wherein a coupling groove and a coupling protrusion are formed on a coupling surface of the stator block and a coupling surface of the pole block, respectively, so as to firmly couple the stator block and the pole block and maintain given curvature of the stator.

3. The reciprocating motor of claim 1, wherein an inner circumferential length and an outer circumferential length of each of the plurality of blocks are equal.

4. The reciprocating motor of claim 1, and wherein each of the plurality of magnets has a circumferential length such that the plurality of magnets does not protrude from the respective plurality of air gaps.

5. The reciprocating motor claim 4, wherein the plurality of magnets has a same radius of curvature as a radius of curvature of the plurality of air gaps.

6. The reciprocating motor of claim 4, wherein a number of the plurality of magnets is equal to a number of the plurality of air gaps.

7. The reciprocating motor of claim 1, wherein inner and outer circumferential surfaces of the stator have a same radius of curvature.

8. A reciprocating motor, comprising:
a stator having an annular shape; and
a mover that reciprocates relative to the stator, wherein the stator is formed by radially laminating a plurality of blocks, wherein each of the plurality of blocks includes an air gap at one axial side thereof, in which the mover is inserted to reciprocate, wherein a plurality of magnets that form the mover is disposed in the plurality of air gaps, respectively, wherein an inner circumferential surface of each of the plurality of blocks, an outer circumferential surface of each of the plurality of blocks, an inner circumferential surface of each of the plurality of air gaps, and outer circumferential surface of each of the plurality of air gaps have a same radius of curvature and a same circumferential length, and wherein each of the plurality of magnets has a circumferential length such that each of the plurality of magnets does not protrude from the respective plurality of air gaps in a circumferential direction.

9. The reciprocating motor of claim 8, wherein each of the plurality of blocks is formed by laminating a plurality of stator cores.

10. The reciprocating motor of claim 8, wherein each of the plurality of blocks comprises:
a stator block having a coil receiving slot to receive a coil therein; and
a pole block that forms a wall surface of the coil receiving slot and is coupled to the stator block to form a respective air gap of the plurality of air gaps along with the stator block.

11. The reciprocating motor of claim 10, wherein the coil has an annular shape, wherein the stator block is formed such that a wall surface corresponding to one axial side of the coil is open, and wherein the pole block is coupled to the open wall surface of the stator block to form the respective air gap of the plurality of air gaps.

12. The reciprocating motor of claim 8 wherein inner and outer circumferential surfaces of the plurality of magnets have a same circumferential length as a length of the respective inner and outer circumferential surfaces of the plurality of air gaps.

13. The reciprocating motor of claim 12, wherein the plurality of magnets has a same radius of curvature as a radius of curvature of the plurality of air gaps.

14. The reciprocating motor of claim 8, wherein a number of the plurality of magnets is equal to a number of the plurality of blocks.

15. A reciprocating compressor, comprising:
a cylinder having a compression space;
a piston inserted into the compression space of the cylinder, that reciprocates relative to the cylinder;
a reciprocating motor having a mover coupled to the cylinder or piston to reciprocate with the cylinder or piston; and
a plurality of resonant springs that elastically supports the mover of the reciprocating motor, wherein the reciprocating motor comprises:
a stator having an annular shape; and the mover that reciprocates relative to the stator, wherein the stator comprises an inner stator positioned inside the mover and an outer stator positioned outside of the mover, and wherein the inner stator and the outer stator are integrally formed as a single body, wherein the stator is formed by radially laminating a plurality of blocks, wherein each of the plurality of blocks includes a pole block coupled to a stator block to form an air gap at one axial side thereof, in which the mover is inserted to reciprocate, wherein a plurality of magnets that form the mover is disposed in the plurality of air gaps, respectively, wherein an inner circumferential surface of each of the plurality of blocks, an outer circumferential surface of each of the plurality of blocks, an inner circumferential surface of each of the plurality of air gaps, and an outer circumferential surface of each of the plurality of air gaps have a same radius of curvature and a same circumferential length, and wherein each of the plurality of magnets have a circumferential length such that each of the plurality of magnets do not protrude from the respective plurality of air gaps in a circumferential direction.

16. The reciprocating compressor of claim 15, wherein a gas bearing is provided between the cylinder and the piston to support the cylinder and the piston using a portion of compressed gas discharged from the compression space.

17. The reciprocating motor of claim 1, wherein an inner circumferential surface and an outer circumferential surface of each of the blocks have a same radius of curvature.

* * * * *